United States Patent
Ma et al.

(10) Patent No.: US 9,112,712 B2
(45) Date of Patent: Aug. 18, 2015

(54) SERVICE SUBSCRIPTION METHOD, SYSTEM AND SERVER

(75) Inventors: Qifeng Ma, Shenzhen (CN); Xiaomin Shi, Shenzhen (CN); Huan Wang, Shenzhen (CN); Jie Tang, Shenzhen (CN); Chong Gu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 12/636,002

(22) Filed: Dec. 11, 2009

(65) Prior Publication Data

US 2010/0091965 A1      Apr. 15, 2010

Related U.S. Application Data (63) Continuation of application No. PCT/CN2008/073415, filed on Dec. 10, 2008.

(30) Foreign Application Priority Data

Dec. 13, 2007    (CN) .......................... 2007 1 0125054

(51) Int. Cl.
*H04M 1/56* (2006.01)
*H04L 12/18* (2006.01)
(Continued)

(52) U.S. Cl.
CPC ............ *H04L 12/1859* (2013.01); *G06Q 30/02* (2013.01); *G06Q 50/10* (2013.01); *H04L 67/16* (2013.01); *H04L 67/306* (2013.01)

(58) Field of Classification Search
CPC .. G06Q 30/0255; G06Q 10/08; H04L 67/306; H04L 63/102; H04N 21/2543; H04W 12/06; H04M 15/61; H04M 1/72563; H04M 3/42365; H04M 3/22; H04M 15/00; H04M 15/38; H04M 1/663; H04M 1/006; H04M 3/42229

USPC .......... 379/142.05, 114.28, 120, 157, 201.02, 379/15.03; 705/344

See application file for complete search history.

(56) References Cited

U.S. PATENT DOCUMENTS 6,266,690 B1 *  7/2001  Shankarappa et al. ........ 709/202
6,611,814 B1    8/2003  Lee et al.
(Continued)

FOREIGN PATENT DOCUMENTS

CN        1333513 A      1/2002
CN        1388461 A      1/2003
(Continued)

OTHER PUBLICATIONS

Chinese Office Action issued in corresponding Chinese Patent Application No. 200710125054.0, mailed Sep. 30, 2010.
(Continued)

*Primary Examiner* — Akelaw Teshale
(74) *Attorney, Agent, or Firm* — Brinks Gilson & Lione (57) ABSTRACT

A service subscription method is provided. The method includes the following steps. A service subscription request is received from a client. The request carries a service identifier (ID). Service information about a service that the client requests to subscribe to and information about related services of the service that the client requests to subscribe to are obtained according to the service ID. Related-service-set subscription information is obtained according to the information about the service to be subscribed to and the information about its related services. The related-service-set subscription information is returned to the client. Moreover, a service subscription system and server are also provided. Through the technical solutions of the present invention, the interaction process of related-service subscription is simplified and the system resources are saved, and the real-time performance of service subscription and the probability of related-service subscription are also increased.

15 Claims, 7 Drawing Sheets

(51) Int. Cl.
*G06Q 30/02* (2012.01)
*G06Q 50/10* (2012.01)
*H04L 29/08* (2006.01)

(56) References Cited

U.S. PATENT DOCUMENTS

| | | | | |
|---|---|---|---|---|
| 7,600,123 | B2* | 10/2009 | Parupudi et al. | 713/175 |
| 7,809,813 | B2* | 10/2010 | Ma et al. | 709/223 |
| 8,271,667 | B2* | 9/2012 | Hoshino et al. | 709/229 |
| 8,458,051 | B1* | 6/2013 | Saltzman et al. | 705/26.7 |
| 2004/0225735 | A1* | 11/2004 | Sakurazawa | 709/225 |
| 2004/0235456 | A1 | 11/2004 | Liao et al. | |
| 2005/0050173 | A1* | 3/2005 | Kikuchi | 709/219 |
| 2006/0031458 | A1* | 2/2006 | Ross | 709/224 |
| 2009/0070185 | A1* | 3/2009 | Farrelly | 705/10 |

FOREIGN PATENT DOCUMENTS

| | | |
|---|---|---|
| CN | 1393812 A | 1/2003 |
| CN | 1859387 A | 11/2006 |
| CN | 1905551 A | 1/2007 |
| CN | 1980378 A | 6/2007 |
| KR | 20020007163 A | 1/2002 |
| WO | 2007/068268 A1 | 6/2007 |

OTHER PUBLICATIONS

Written Opinion of the International Searching Authority issued in corresponding PCT Patent Application No. PCT/CN2008/073415, mailed Mar. 19, 2009.
Office Action issued in corresponding Chinese Patent Application No. 200710125054.0, mailed Apr. 26, 2011.
Office Action issued in corresponding Chinese Patent Application No. 200710125054.0, mailed Aug. 10, 2011.
Supplementary European Search Report issued in corresponding European Patent Application No. EP 08 86 3144; mailed Jul. 6, 2012.
Notice from European Patent Office dated Oct. 1, 2007 Concerning Business Methods.

* cited by examiner

FIG. 5B

SERVICE SUBSCRIPTION METHOD, SYSTEM AND SERVER

CROSS-REFERENCE TO RELATED APPLICATIONS

This application is a continuation of International Application No. PCT/CN2008/073415, filed on Dec. 10, 2008, which claims priority to Chinese Patent Application No. 200710125054.0, filed on Dec. 13, 2007, both of which are hereby incorporated by reference in their entireties.

FIELD OF THE TECHNOLOGY

The present invention relates to the field of communication technology, and more particularly to a service subscription method, system, and server.

BACKGROUND OF THE INVENTION

With the development of network technology and the convergence between telecommunication networks and the Internet, services in the telecommunication networks increase rapidly, giving rise to huge service subscription demands of users. Especially, as the relationships between existing services become more and more complicated, various related services have emerged, and the users have urgent demands for subscription and management of the related services. When a user needs a certain type of service, the user interacts with a service provider through a terminal device such as a cell phone or a telephone to subscribe to the service. The type of the service includes conventional telecommunication services such as monthly package and short message package and other non-communication services such as hotel reservation, weather query, and stock information. The service provider may be a telecommunication operator or a professional service provider. In the existing communication services, a large amount of service data of user applied services is accumulated. The habits and characteristics of the users in using the telecommunication services are specifically recorded in the data. With a detailed analysis, some characteristics of the users' consumption may be obtained, so that more customized services may be provided for the users, and scientific foundations may be provided for management decisions of the operators and service providers. The related services indicate some kind of relation between independent services. Such a relation may be in terms of user habits, hobbies, and the like. For example, a user usually subscribes to a cellphone news service and an online music service together. The services themselves may also be specifically related. For example, the subscription to an airline ticket reservation service is usually followed by the subscription to a hotel reservation service.

When a certain service is needed, the user sends a service subscription request to a service subscription server through a client. The service subscription server responds to the subscription request, completes a service subscription operation, and returns a subscription result to the client. When the user has successfully subscribed to the service, in order to promote other services, the operator and service provider usually recommend some related services to the user. The recommendation method includes sending a service advertisement message to the user, sending a service recommendation message after the user subscribes to a service, and the like. A common method for related-service recommendation is that, a service server or a subscription management server recommends a set of related services immediately after the user successfully requests to subscribe to a service, for example, sending a recommendation short message, e-mail, or the like to the user. The user may restart a new subscription request depending on the recommended services, and subscribe to the recommended related services to the subscription management server.

Figure 1:
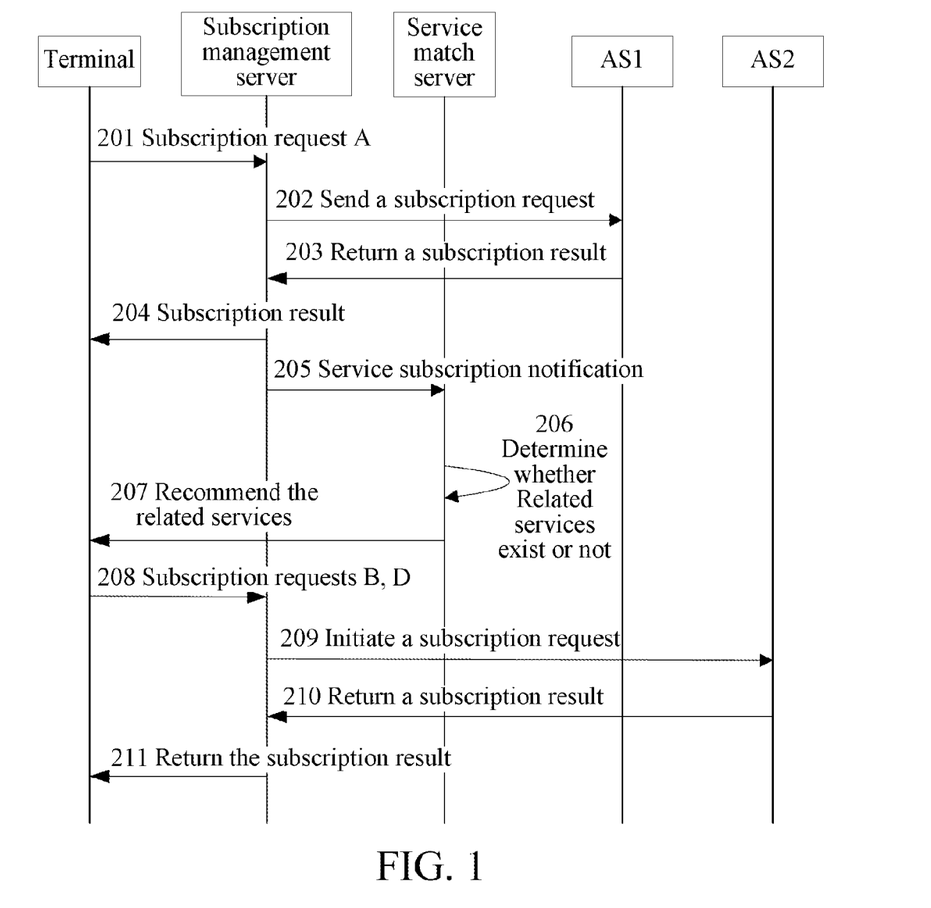
FIG. 1 is a flow chart of a service subscription method in the prior art.

Generally, a service subscription process with a service recommendation function in the conventional art is shown in FIG. 1.

In Step 201, a device sends a service registration request A to a service-subscription management system that the device belongs to.

In Step 202, the service-subscription management system sends a subscription request to a service server (AS1).

In Step 203, the service server (AS1) returns a subscription result A to the service-subscription management system.

In Step 204, the service-subscription management system returns the subscription result A to a terminal.

In Step 205, the service-subscription management system notifies a service match server of the service subscription result.

In Step 206, the service match server determines whether a service A has related services or not.

In Step 207, the service match server sends a recommendation message (service B, C, or D) to the terminal.

In Step 208, the terminal sends a subscription request (service B or D).

In Step 209, the service-subscription management system sends a registration request (service B or D) to a service server (AS2).

In Step 210, the service server (AS2) returns a subscription result to the service-subscription management system.

In Step 211, the service-subscription management system returns the subscription result to the user device.

Based on the conventional art described above, the inventor found in the implementation process that the following problems may occur during actual service subscription.

Firstly, the interaction process of related-service subscription is complicated, resulting in waste of system resources. When a subscriber subscribes to a service, the subscription management server completes the currently requested subscription, then generates recommended services for the subscriber according to a user profile of the subscriber and information about the service requested to be subscribed to currently, and sends the recommended services to the subscriber. If the subscriber accepts the services recommended by the subscription management server, the subscriber needs to perform a service subscription operation again to complete the subscription to the recommended services. Particularly, when a large number of recommended services are needed, the user has to perform the subscription request operation many times. Therefore, the subscription scheme in the conventional art is rather inconvenient to operate, and plenty of system resources are consumed. Secondly, the probability of related-service subscription is low. After viewing a message indicating that the subscription to a service is successful, the user usually pays little attention to or even ignores the subsequent subscription introduction of other services, resulting in a low possibility for the recommended services to be subscribed to. Moreover, the usability is poor and the customized demands of the users are unable to be satisfied. Currently, an improved method of service recommendation by using predefined relating rules may be applied to simplify the related-service subscription to a certain extent. However, as the related services are predefined, the related services may only be services like the preset service packages. Besides, the types of the related services are fixed, and the related services cannot be customized for the users, resulting in poor usability. Once the user subscribes to any of the related services, the subscription server automatically subscribes to all the related services for the user, despite the fact that the user may only need a part of the services, and is not willing to subscribe to all the services. Thereby, the freedom of the user in service subscription is decreased.

SUMMARY OF THE INVENTION

Accordingly, the present invention is directed to a technical solution, in which service information about a service that a subscriber currently requests to subscribe to and service information about its related services are combined into related-service-set subscription information for the subscriber, and the related-service-set subscription information is sent to the subscriber, so that the subscriber confirms the related services that need to be subscribed to depending on actual requirements, and a service server subscribes to the corresponding services according to the confirmation of the subscriber.

In an embodiment, the present invention provides a service subscription method, which includes the following steps.

A service subscription request is received from a client. The request carries a user identifier (ID) and a service ID.

Information about a service that the client requests to subscribe to is obtained according to the service ID.

Information about related services of the service that the client requests to subscribe to is obtained according to the user ID and the service ID.

The information about the related services and the information about the service requested to be subscribed to are combined into related-service-set subscription information.

The related-service-set subscription information is returned to the client.

In an embodiment, the present invention further provides another service subscription method, which includes the following steps.

A service subscription request is sent to a service subscription server. The request carries a user ID and a service ID.

Related-service-set subscription information returned by the subscription server is received.

A service that needs to be subscribed to is selected according to the related-service-set subscription information.

In an embodiment, the present invention further provides a service subscription server, which includes a subscription management module.

The subscription management module is adapted to receive a service subscription request from a client, obtain information about a service according to a service ID carried in the request, request a service match server to match related services, receive information about the related services returned by the service match server, combine the information about the service and the information about the related services into related-service-set subscription information, and return the related-service-set subscription information to the client.

Alternatively, the subscription management module is adapted to request a service match server to match related services, receive related-service-set subscription information derived from a combination made by the service match server of the information about the service and found information about the related services, and return the related-service-set subscription information to the client.

In an embodiment, the present invention further provides a service subscription system, which includes a service subscription server and a service match server.

The service subscription server is adapted to receive a service subscription request from a client, obtain information about a service according to a service ID carried in the request, request the service match server to match related services, receive related-service-set subscription information derived from a combination made by the service match server of the information about the service and found information about the related services, and return the related-service-set subscription information to the client.

The service match server is adapted to receive a request from the service subscription server to match the related services, find the related services of the service requested to be subscribed to for the user according to preset matching rules, obtain information about the related services, combine the information about the service and the found information about the related services into related-service-set subscription information, and return the related-service-set subscription information to the service subscription server.

In an embodiment, the present invention further provides another service subscription system, which includes a service subscription server and a service match server.

The service subscription server is adapted to receive a service subscription request from a client, obtain information about a service according to a service ID carried in the request, request the service match server to match related services, receive information about the related services returned by the service match server, combine the information about the service and the information about the related services into related-service-set subscription information, and return the related-service-set subscription information to the client.

The service match server is adapted to receive a request from the service subscription server to match the related services, find the related services of the service requested to be subscribed to for the user according to preset matching rules, obtain information about the related services, and send the information about the related services to the service subscription server.

In an embodiment, the present invention further provides a service match server, which includes a receiving module, a relating module, and a sending module.

The receiving module is adapted to receive a request of matching related services sent by a service subscription server.

The relating module finds related services of the service requested to be subscribed to for the user according to preset matching rules and obtains information about the related services.

The sending module is adapted to send the information about the related services to the service subscription server.

Seen from the above technical solution of the present invention, service information about a service that a subscriber currently requests to subscribe to and service information about its related services are combined into related-service-set subscription information for the subscriber, and the related-service-set subscription information is sent to the subscriber, so that the subscriber confirms the related services that need to be subscribed to depending on actual requirements, and a service server subscribes to the corresponding services according to the confirmation of the subscriber. Therefore, the interaction process of related-service subscription is simplified, and the system resources are saved. Moreover, the real-time performance of service subscription is also improved, and the probability of related-service subscription is increased.

DETAILED DESCRIPTION OF THE EMBODIMENTS

In an embodiment, the present invention provides a service subscription method, which includes the following steps. A service subscription request is received from a client. The request carries a user ID and a service ID. Information about a service that the client requests to subscribe to is obtained according to the service ID. Information about related services of the service that the client requests to subscribe to is obtained according to the user ID and the service ID. The information about the related services and the information about the service requested to be subscribed to are combined into related-service-set subscription information. The related-service-set subscription information is returned to the client. Therefore, the interaction process of related-service subscription is simplified, and the system resources are saved. Moreover, the real-time performance of service subscription is also improved, and the probability of related-service subscription is increased.

Figure 2:
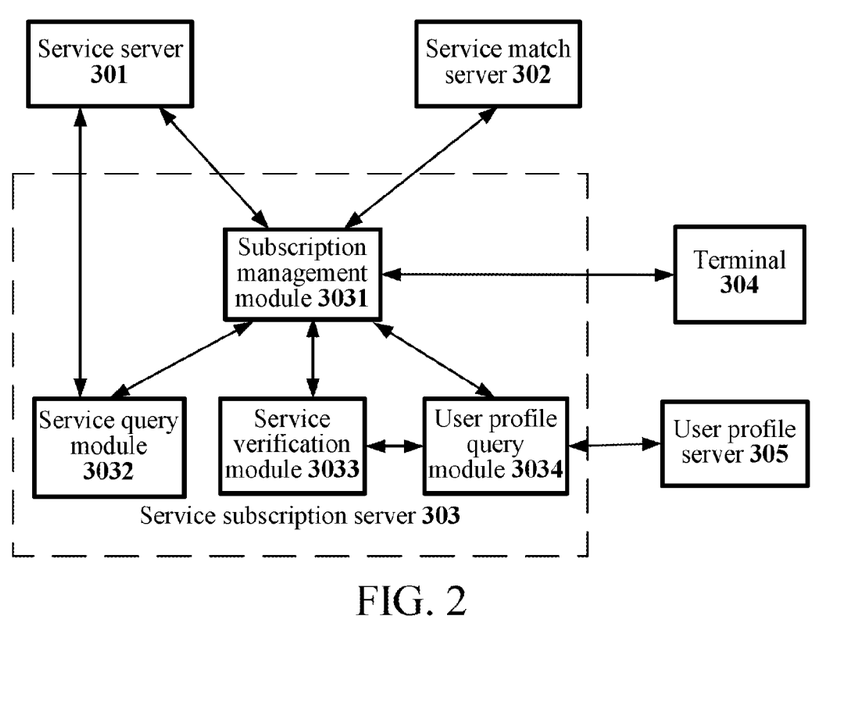
FIG. 2 is a schematic structural view of a service subscription system according to an embodiment of the present invention.

In order to realize the above method, in an embodiment, the present invention provides a service subscription system. FIG. 2 is a schematic structural view of the system according to an embodiment of the present invention. The system includes a service server 301 (the service server may be multiple, for example, including a service server 1, a service server 2, . . . , and a service server n), a service match server 302, a service subscription server 303, a terminal 304, and a user profile manager server 305.

The terminal 304 is a terminal access device such as a cell phone, an intelligent terminal, a PDA, and a PC, which gets access to a telecommunication network or the Internet in a wired or wireless manner, and supports existing communication and network protocols, like GPRS, TCP/IP, and HTTP. The terminal 304 is adapted to operate a service subscription client, so as to enable the service subscription client to interact with the service subscription server 303 and the service server 301. The service subscription client may be specific software or a general browser such as Internet Explorer, Firefox, and Netscape.

The service subscription server 303 interacts with the service subscription client in the terminal 304 and processes a service subscription request from the client. The service subscription server 303 may be a Web server that provides Web access services for the client, so that the service subscription client is enabled to perform service subscription through a Web page. Definitely, the service subscription server may also be other servers. The service subscription server 303 may obtain a user ID (e.g. a cell phone number of the user, a user name, or the like) and capability parameters of its terminal device (e.g. CPU, memory capacity, operating system version, supported protocols, and the like) through the subscription request sent by the service subscription client. The service subscription server 303 interacts with the service server 301 and the user profile manager server 305, so as to obtain service information and a user profile (i.e. user information), verify the validity of the user and the service, send a service-subscription-related message, process a subscription response message, and the like.

The user profile manager server 305 stores the user profile (i.e. user information), which includes personal information such as the user ID, payment status, credit rank, interests, hobbies, occupation, and educational background. This function may be accomplished by one database. The database receives a query from the service subscription server 303, and returns a query result to the service subscription server 303.

The service match server 302 includes a receiving module, a relating module, and a sending module. The receiving module is adapted to receive a request of matching related services from the service subscription server 303. The relating module is adapted to find other related services of the service requested to be subscribed to for the subscriber according to corresponding matching rules and generate information about the related services. The sending module is adapted to send the information about the related services to the service subscription server 303. The matching rules may be preset in the service match server 305, and include system default matching rules. For example, other related services may be found according to data such as a user profile (i.e. user information including the age, hobbies, occupation, credit rank, and the like of the user), service information, and related-service set. Alternatively, a historical subscription record of the user may be found according to the user ID, and the historical subscription record of the service and other services subscribed to together with the service are looked up in a user-subscription historical-record table. The matching rules may also include some user-defined service filtering rules. The service match server 302 may further include a service combining module adapted to combine the information about the related services and the information about the service subscribed to by the subscriber into related-service-set subscription information and send the related-service-set subscription information to the service subscription server 303 through the sending module. The service combining module is also adapted to generate corresponding service subscription instructions, and send the instructions to the service subscriber through the service subscription server. The service subscription instructions include instructing a user on how to perform service subscription or providing some service combinations for the user to choose from.

The service server 301 provides various application service functions, and is an entity that specifically implements various services. The service server 301 is adapted to receive a service query from the service subscription server and return corresponding service information, and receive a service subscription request from the service subscription server 303 and return a subscribed service. The service server 301 is also adapted to initiatively publish service information to the service subscription server 303, for example, messages about the release of a new service, service canceling, and service changing, so as to maintain the service information in the service subscription server.

The service subscription server 303 further includes a subscription management module 3031, a service query module 3032, a user profile query module 3034, and a service verification module 3033.

The subscription management module 3031 is a main control module in the service subscription server 303, mainly responsible for invoking all the modules to accomplish service subscription. After receiving a service subscription request sent by the service subscription client, the subscription management module 3031 sends a query request to the user profile query module 3034 according to the user ID in the service subscription request to obtain a user profile. The subscription management module 3031 sends a verification request of the user and the service to the service verification module 3033. If the verification fails, the subscription management module 3031 rejects the subscription request, and sends a subscription rejection message to the service subscription client, in which the verification function is optional. If the verification of service subscription is successful, the subscription management module 3031 requests the service match server 302 to generate related-service-set subscription information, receives the related-service-set subscription information returned by the service match server 302, and sends the received information to the terminal 304. Optionally, after receiving the related-service-set subscription information returned by the service match server 302, the subscription management module 3031 further requests the service verification module 3033 to verify the validity of the related services, and delete the invalid related services according to the verification result. The specific implementation is illustrated in detail below. The related-service-set subscription information includes various service combinations of the service subscribed to by the user and its related services according to preset policies, or the service ID of the service subscribed to by the user and the service IDs of its related services. The related-service-set subscription information may also include service subscription instructions.

The subscription management module 3031 is also adapted to receive the information about the related services returned by the service match server 302, combine the service subscribed to by the user and the related services into related-service-set subscription information, and send the related-service-set subscription information to the terminal 304. After receiving the information about the related services returned by the service match server 302, the subscription management module further requests the service verification module 3033 to verify the validity of the related services, and deletes the invalid related services according to the verification result. The specific implementation is illustrated in detail below.

The subscription management module 3031 is further adapted to generate service subscription instructions according to the corresponding related services and the service that the user has subscribed to, and return the service subscription instructions to the user. After the service subscription client selects to subscribe to all or a part of the services carried in the related-service-set subscription information, the subscription management module 3031 sends a service subscription request message to the related service server 301, and the service server 301 performs a service subscription operation on receiving the subscription request. After completing the subscription operation, the service server 301 returns a subscription result message to the subscription management module 3031, indicating whether the subscription operation is successful or not. The subscription management module 3031 returns the subscription result message to the service subscription client according to the service subscription result.

The service query module 3032 receives a query request from the subscription management module 3031, queries each service server 301 for service information according to the service ID in the request, stores service description information about each service server, generates a service information table, and maintains the service information table periodically. Alternatively, the service query module 3032 receives and stores service information initiatively sent by the service server.

When a user needs a certain type of service, the user may send a service query request to the service subscription server 303 through the service subscription client, so as to obtain all the service information related to the service. The query request may carry a corresponding query parameter, and the query parameter includes a keyword, service classification, or the like. When the query is performed by keyword, the subscriber sends a query request to the subscription management module 3031. The parameter carried in the query request includes a keyword. The subscription management module 3031 queries related services in the service server 301 according to the keyword through the service query module 3032, and returns information about the related services to the subscriber. The information about the related services may be carried in the form of a service list. When the service is queried according to the service classification, the user selects a certain type of service from a service classification table provided by the subscription management module 3031, and sends a query request to the subscription management module 3031. The request parameter includes a service subject number. The subscription management module 3031 feeds back a service list to the subscriber according to the service subject number.

The user profile query module 3034 receives a user profile query request sent by the subscription management module 3031, sends a query request to the user profile manager server 305, and receives a user profile related to the subscribed service returned by the user profile manager server 305. If the user ID does not exist or is invalid, the user profile manager server 305 returns a null query result and returns a user-ID invalid message. If the user exists, the user profile manager server 305 returns a query result. The result carries information about the validity of a user ID, payment status, credit rank, occupation, hobbies, and the like of the user.

The service verification module 3033 receives a verification request from the subscription management module 3031, and verifies the validity of the user profile and the service information. A service verification rule table is preset in the service verification module 3033. The verification rule table lists predefined verification rules, and the service verification module 3033 determines whether the user has the right to subscribe to related services or not according to the verification rules. The verification rules may be a series of data items. Each item of the user profile is set in the rules, for example, a user that subscribes to the airline ticket reservation service should not be a delinquent account, and has a credit rank above Level 3. It should be noted that, the verification rules may also be defined in other manners. The service verification module 3033 invokes the user profile query module 3034 to query the user profile. The query request carries the user ID and the name of a data item to be verified, for example, age, credit rank, or occupation. After receiving related items returned by the user profile query module, the service verification module 3033 matches the related items with the verification rules one by one, and returns a verification result to the subscription management module 3031. The content of the verification result information includes the verification result and descriptions thereof.

Figure 3:
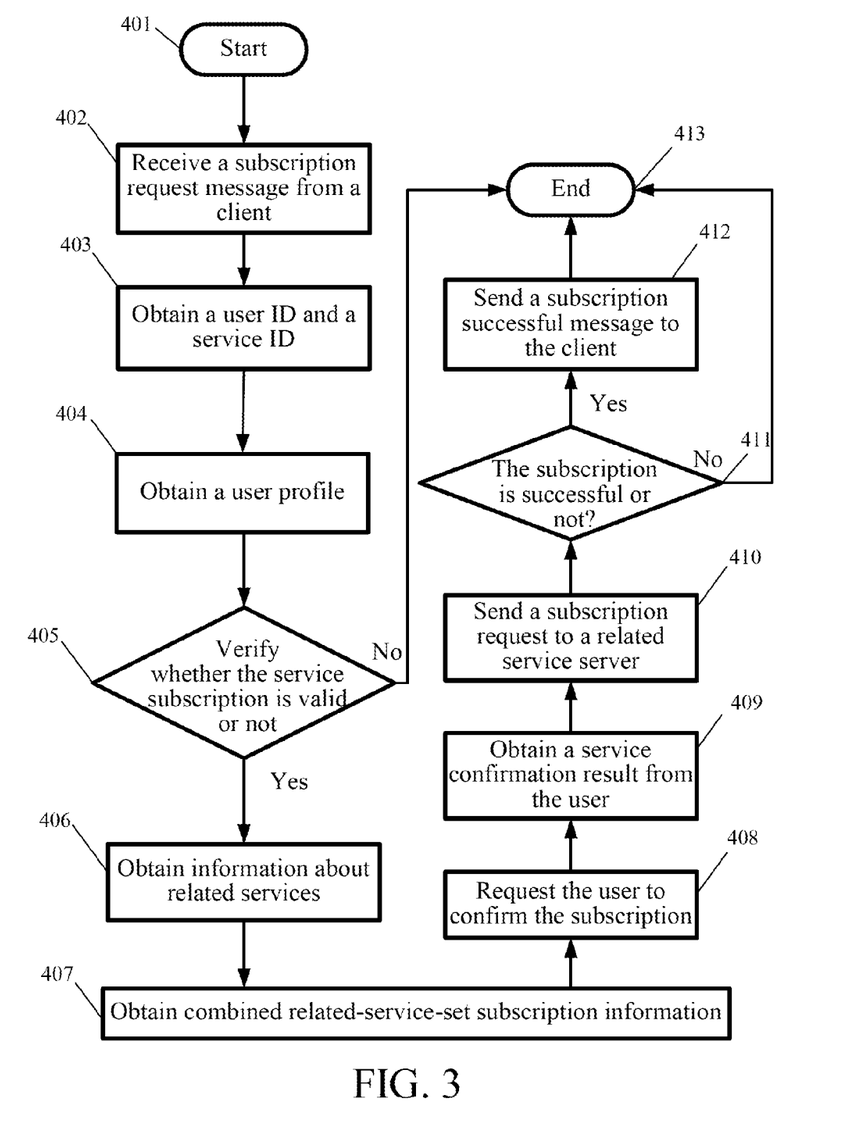
FIG. 3 is a flow chart of a service subscription method according to an embodiment of the present invention.

In view of the above system, the present invention further provides a service subscription method. FIG. 3 is a flow chart of the method according to an embodiment of the present invention. The method includes the following steps.

In Step 401, the process starts.

A service query step may be carried out after Step 401 and before Step 402. Specifically, a service query request is received from a service subscription client. The request carries a parameter including a keyword and/or a service subject number. A corresponding service is queried according to the keyword and/or the service subject number, and a target service list is generated. The target service list is returned to the service subscription client.

In Step 402, a subscription request message is received from the service subscription client.

The subscription request message carries a user ID and a service ID. Optionally, the service subscription request message may also carry terminal device parameters, such as capabilities of software and hardware installed on a terminal device.

In Step 403, the user ID and the service ID are obtained.

Optionally, when the request carries terminal device parameters, the terminal device parameters are further obtained.

In Step 404, a user profile is obtained.

The specific implementation may be as follows. A user profile query request is sent to a user profile manager server. The request carries a user ID and a verification item list. That is, a query request is generated according to the user ID and the required verification item list, for example, an SQL query request, and the query request is sent to the user profile manager server to receive a query result returned by the user profile manager server.

In Step 405, the validity of service subscription is verified. If the verification is successful, the process proceeds to Step 406; otherwise, the process skips to Step 413.

The specific implementation may be as follows. According to the query result including the user profile to be verified returned by the user profile manager server, it is checked whether the returned user profile meets the requirements of verification items corresponding to the service ID recorded in the verification rule table. If the verification is successful, Step 406 is performed; otherwise, Step 413 is performed and the process ends. The verification result may also be returned to the subscription client after the verification is passed, and the result carries a verification result identifier and descriptions thereof.

In Step 406, related services are obtained.

The specific implementation may be as follows. A service-related request is sent to the service match server. The request carries a user ID or a user profile and a service ID or service information. Optionally, the request may also carry user-defined matching rules. The matching rules may be included in the received service subscription request message or the service query message.

The service match server searches for historical subscription records of the service of the user and related services subscribed to together with the service according to the user ID and the service ID. The related services are found according to the user profile (e.g. information about the hobbies, occupation, educational background, credit rank, and the like of the user) by the preset matching rules. The found related services are filtered and/or combined to obtain information about the related services.

Alternatively, the service match server searches for historical subscription records of the service of the user and related services subscribed to together with the service according to the user ID and the service ID. The related services are found according to the user-defined matching rules. The found related services are filtered and/or combined to obtain information about the related services.

In Step 407, related-service-set subscription information is obtained.

The obtained information about the related services and the information about the service that the user has subscribed to are combined into the related-service-set subscription information.

Optionally, the validity of related-service subscription is verified before Step 407 and after Step 406. The specific implementation of the verification is the same as Step 405. It may also be verified whether the corresponding related services are valid for the user or not according to the device parameters of the user terminal and other verification rules. The validity verification includes determining whether the device parameters of the user terminal, the credit rank of the user, and the like are valid or not.

In Step 408, the user is requested to confirm the subscription.

The related-service-set subscription information is sent to the service subscription client. The user confirms the related service items that need to be subscribed to.

In Step 409, a confirmation result is obtained from the user.

In Step 410, a subscription request is sent to a related service server.

The subscription request is sent to the corresponding service server according to the related service items confirmed by the user.

In Step 411, a response returned by the service server is received, indicating whether the subscription is successful or not. If the subscription is successful, the process proceeds to Step 412; otherwise, the process skips to Step 413.

In Step 412, a service-subscription successful message is sent to the service subscription client.

In Step 413, the process ends.

The service subscription process is illustrated in detail below through the embodiments.

Figure 4A:
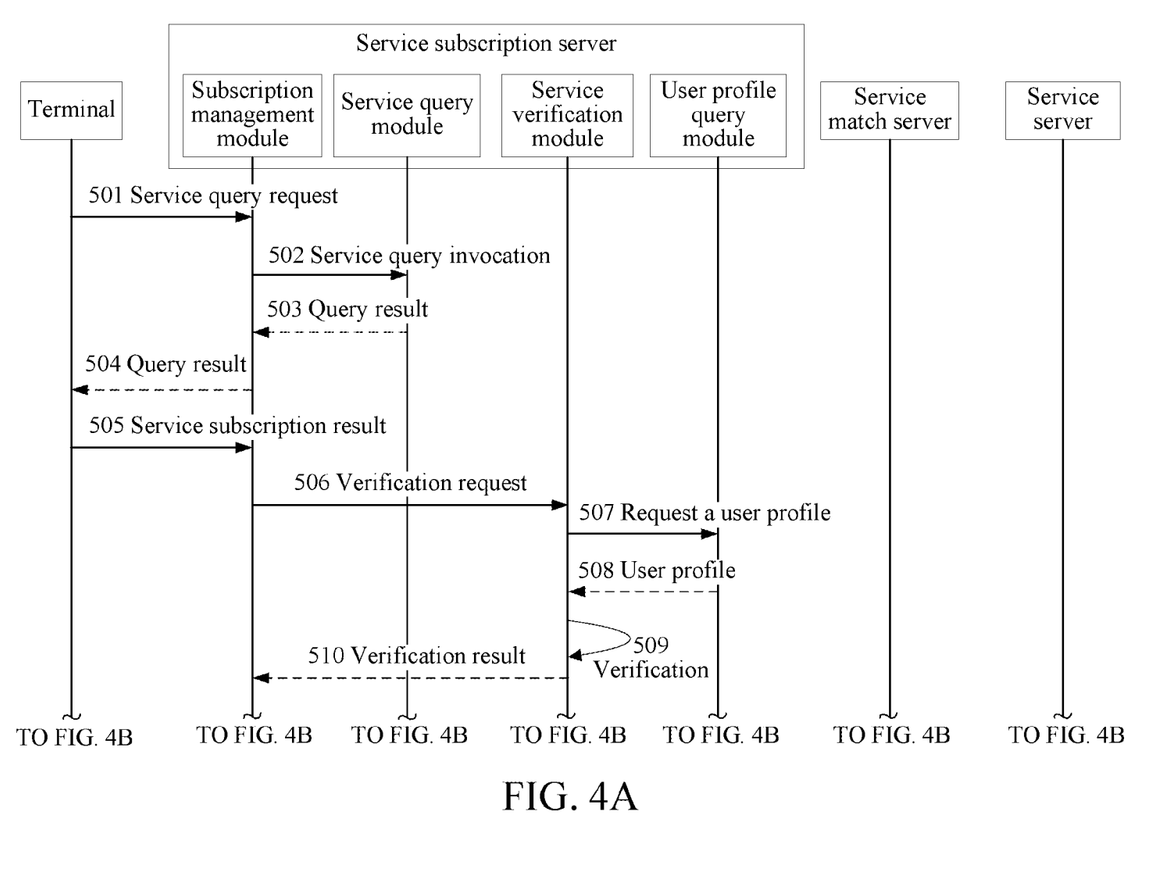
FIG. 4A-4B is a flow chart of a service subscription method according to a first embodiment of the present invention.
Figure 4B:
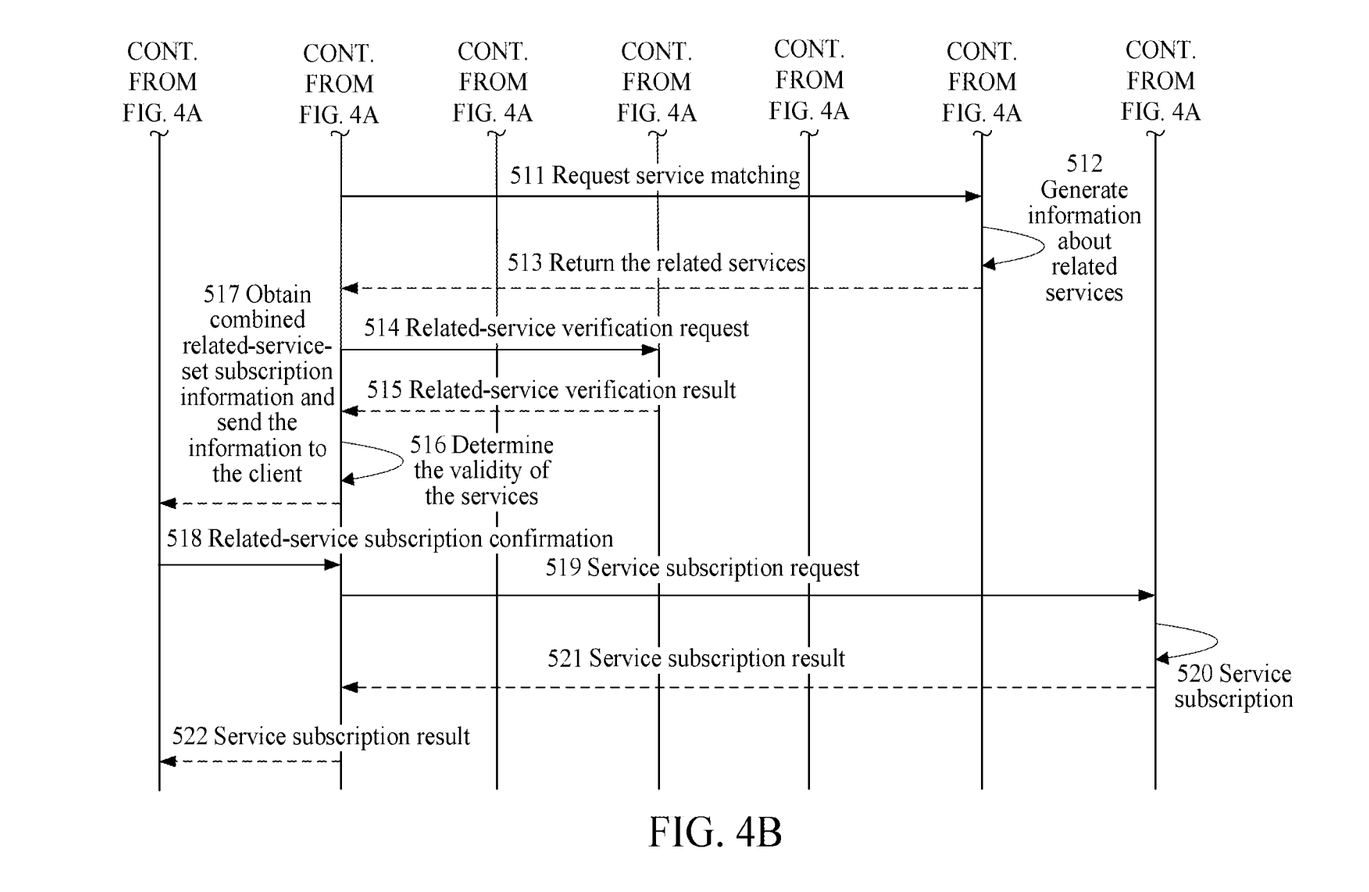

In a first embodiment, as shown in FIG. 4A-4B, the service subscription process specifically includes the following steps.

In Step 501, the service subscription client in the terminal sends a service query request to the service subscription server. The request carries a query parameter. The query parameter includes a keyword and/or a service subject number, for example, hotel and/or catering.

In Step 502, after receiving the query request, a subscription management module in the subscription server transmits the keyword and/or the service subject number to the service query module.

In Step 503, the service query module searches in a service information table according to the keyword and/or the service subject number, and returns a query result to the subscription management module (in the form of a service list or in other forms). The service list may be denoted in an xml file as follows.

```
<? xml version="1.0" encoding="GB2312" ?>
<Hotel List>
    <hotel>
        <Service ID> h1001 </Service ID>
        <name> Cygnet Hotel </name>
        <price> 500.00RMB </price>
        <discount> 8.0 </discount>
        <description>Five-star hotel, single standard room, free
breakfast, and free Internet access service.
        </description>
    </hotel>
    <hotel>
    <Service ID> h1002 </Service ID>
        <name> Beijing Hotel </name>
        <price> 550.00 </price>
        <discount> 8.5 </discount>
        <description>Five-star hotel, single standard room,
free lunch, free Internet access service, and free airport shuttle.
        </description>
    </hotel>
    ...
</Hotel List>
```

The service list includes information about identifiers and names of one or more services and descriptions thereof.

In Step 504, the subscription management module sends the service list to the service subscription client.

In Step 505, the user selects a service according to the service list, and sends a service subscription request to the subscription management module. The request carries a user ID and a service ID, and may also carry capability parameters of a terminal device. In this embodiment, the two identifiers and the capability parameters are all included. The capability parameters of the terminal device include CPU, memory capacity, operating system version, supported protocols, and the like. Parameters defined in other existing standards may also be adopted directly, for example, terminal parameters defined in OMA. The service subscription request may be denoted in an xml message as follows.

```
<? xml version="1.0" encoding="GB2312" ?>
<request>
    <UID>13912345678</UID>
    <Service ID>h1002</Service ID>
    <Device parameter>
        <cpu> ARM 11 </cpu>
        <memory> 32M </memory>
        <os> symbian </os>
        <client> firefox </client>
        <protocol> WAP </protocol>
        <bandwidth> 100k </bandwidth>
        ...
    </Device parameter>
</request>
```

In Step 506, the subscription management module sends a verification request to the verification module. The request carries the user ID, the service ID, and the capability parameters of the terminal device.

In Step 507, the verification module searches for items that need to be verified according to the service ID, and sends a query request to the user profile query module. The request carries the user ID and a verification item list. The verification item list includes one or more user profile item names, such as a credit rank, an account balance, hobbies, and an occupation and the like of the user. The query request may be denoted in an xml message as follows.

```
<?xml version="1.0" encoding="GB2312" ?>
<request>
    <UID>13912345678</UID>
    <item list>
        <credit rank/>
        <hobby/>
        <occupation/>
        <balance/>
        ...
    </Device parameter>
</request>
```

In Step 508, the user profile query module transmits the user profile to the verification module.

The query request may be denoted in an xml message as follows.

```
<?xml version="1.0" encoding="GB2312" ?>
<response>
<credit rank> 5.0 </credit rank>
<hobby> sports, music, movie </hobby>
<occupation> software engineer </occupation>
<balance> 35.12RMB </balance>
</response>
```

In Step 509, the verification module performs a verification operation. Each data item in the query result is matched with a corresponding item in the verification rule table, and a verification result is generated.

If all the data items in the query result meet corresponding item requirements in the verification rule table, the verification is successful; otherwise, the verification fails. For example, the service ID in the hotel reservation service that the user requests to subscribe to is an h1002 service, and the verification rule table requires that the credit rank of the user is higher than 3.0 and the account balance is greater than 500 RMB as two verified items. The user profile data queried in Step 508 for the two verification items are: the credit rank is 5.0 and the balance is 35.12 RMB. It is determined that the verification fails through matching.

In Step 510, the verification module returns the verification result to the subscription management module.

It should be noted that, in actual service subscription, the above step may be omitted, or replaced by other verification manners.

In Step 511, if the verification is successful, the subscription management module sends a match service request to the service match server. The request carries the user ID or user profile and the service ID or service information. If the verification fails, the subscriber is rejected to subscribe to the service, and a subscription rejection explanation message is sent to the client. The subscription process ends.

In Step 512, the service match server matches related services to obtain information about the related services, and returns the information about the related services to the service subscription server. The information about the related services may be recorded in the form of a related service list. The related service list includes information about identifiers of one or more services and descriptions thereof.

The service match server finds related services of the subscribed service according to the user ID and the service ID, or according to the user profile, the service information, and the corresponding matching rules, and generates information about the related services. The information about the related services may be expressed in the form of a related service list. The matching rules may be default in the system or user-defined. The specific implementation has already been described above, and will not be repeated herein again. The related service list may be denoted in an xml file as follows.

```
<?xml version="1.0" encoding="GB2312" ?>
<related service list>
    <service>
    <service>
    <Service ID> h1002 </Service ID>
        <name> Beijing Hotel </name>
        <price> 550.00 </price>
        <discount> 8.5 </discount>
        <description> Five-star hotel, single standard room, free lunch, free Internet access service, and free airport shuttle.
    </description>
    </service>
        <Service ID> f1004 </Service ID>
        <name> airline ticket reservation </name>
        <price> 1250RMB </price>
        <discount> 8.0 </discount>
        <data> 2007/10/25 </data>
        <description> Free ticket delivery, and aviation accident insurance.
        </description>
    </service>
    <service>
        <Service ID> t2004 </Service ID>
        <name> guide service </name>
        <price> 3000RMB </price>
```

```
        <description> Three-day tour in Beijing, including scenic
    spots like the Palace Museum, the Great Wall, and the Summer Palace,
    ticket cost included, free rides, food and beverage at the tourists' own
    expenses, and professional tour guides.
        </description>
    </service>
</related service list>
```

It should be noted that, the service match server may also combine the service that the user has subscribed to and the found related services into related-service-set subscription information, and return the related-service-set subscription information to the service subscription server. The related-service-set subscription information includes various combinations of the service that the user has subscribed to and the found related services according to predetermined policies (such as the subscription historical records of the user and characteristics of each service). The related-service-set subscription information may further include subscription instructions to instruct a user on how to perform related service subscription. Alternatively, the related-service-set subscription information includes service IDs of the services, where the service IDs are found by the service match server and related to the service that the user has subscribed to, and the service ID of the service that the user has subscribed to. The related-service-set subscription information may also include subscription instructions to instruct a user on how to perform related service subscription. In this case, the service subscription server does not need to verify the validity of the related-service subscription and directly returns the related-service-set subscription information to the service subscription client. The service subscription server may also verify the combined related-service-set subscription information, and delete the services or combined-service items that fail the verification from the related-service-set subscription information. The filtered related-service-set subscription information is then returned to the subscription client.

In Step 513, the service match server sends the information about the related services to the subscription server.

In Step 514, the subscription management module transmits the user ID and the information about the related services to the verification module for verification, so as to filter the services generated by the service match server that are invalid for the current user, for example, the current device of the user does not support the service. The specific verification process is the same as that in Step 509.

In Step 515, the verification module transmits a verification result of the related services to the subscription management module.

In Step 516, the subscription management module deletes the services that fail the verification from the information about the related services.

In Step 517, the subscription management module combines the information about the service that the user has subscribed to and the information about the filtered related services into related-service-set subscription information, and returns the related-service-set subscription information to the service subscription client. The related-service-set subscription information includes various combinations of the service that the user has subscribed to and the filtered related services according to predetermined policies, and may further include subscription instructions or service descriptions to instruct a user on how to perform related service subscription. Alternatively, the related-service-set subscription information includes the service IDs of the services related to the service that the user has subscribed to and the service ID of the service that the user has subscribed to found by the service match server, and may further include subscription instructions to instruct a user on how to perform related service subscription. The related-service-set subscription information may be denoted in an XML file as follows.

```
<?xml version="1.0" encoding="GB2312" ?>
<related subscription>
    <subscription code>
        Please send 001 to 010086 to subscribe to the current
        service only;
        Please send 002 to 010086 to subscribe to all the
        recommended services;
        Please send 001 + recommended service code 1 +
    recommended service code 2 (a plurality of service codes may be added)
    to 010086 to subscribe to the current service and a part of the
    recommended services.
    </subscription code>
    <related service list>
    <service>
        <Service ID> f1004 </Service ID>
            <name> airline ticket reservation </name>
            <price> 1250RMB </price>
            <discount> 8.0 </discount>
            <data> 2007/10/25 </data>
            <description> Free ticket delivery, and aviation accident
            insurance.
            </description>
    </service>
    <service>
        <Service ID> t2004 </Service ID>
            <name> guide service </name>
            <price> 3000RMB </price>
            <description> Three-day tour in Beijing, including scenic
        spots like the Palace Museum, the Great Wall, and the Summer Palace,
        ticket cost included, free rides, food and beverage at the tourists' own
        expenses, and professional tour guides.
            </description>
    </service>
    </related service list>
</related subscription>
```

In Step 518, the user selects all or a part of the services carried in the related-service-set subscription information through the service subscription client, and sends a confirmation message to the subscription management module, for example, a message carrying a confirmed service list. The confirmed service list includes one or more service IDs.

In Step 519, the subscription management module sends a subscription request to a service server related to the service in the subscribed service list. The request carries the user ID and the service ID.

In Step 520, the service server performs a subscription operation.

In Step 521, the service server returns a subscription result to the subscription management module.

In Step 522, the subscription management module sends the subscription result to the client.

Figure 5A:
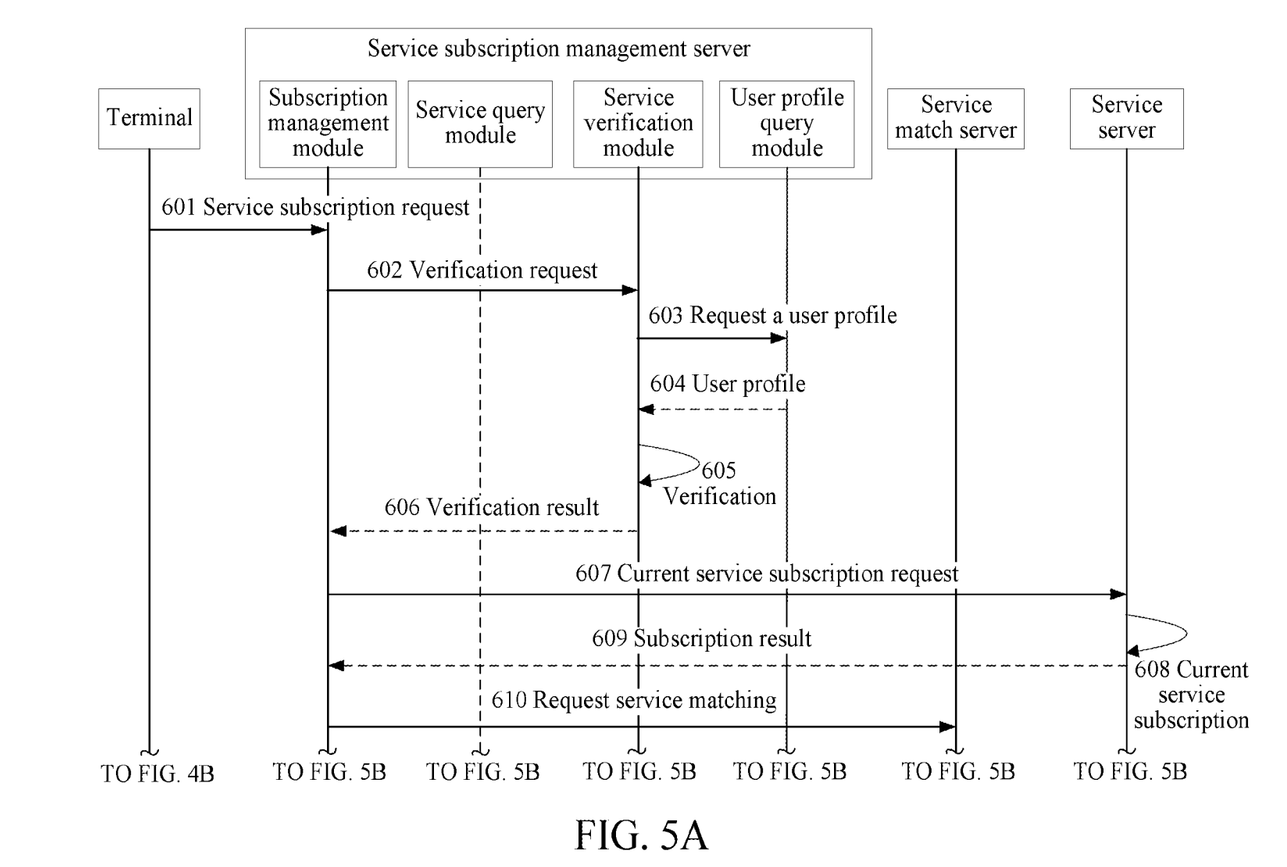
FIG. 5A-5B is a flow chart of a service subscription method according to a second embodiment of the present invention.
Figure 5B:
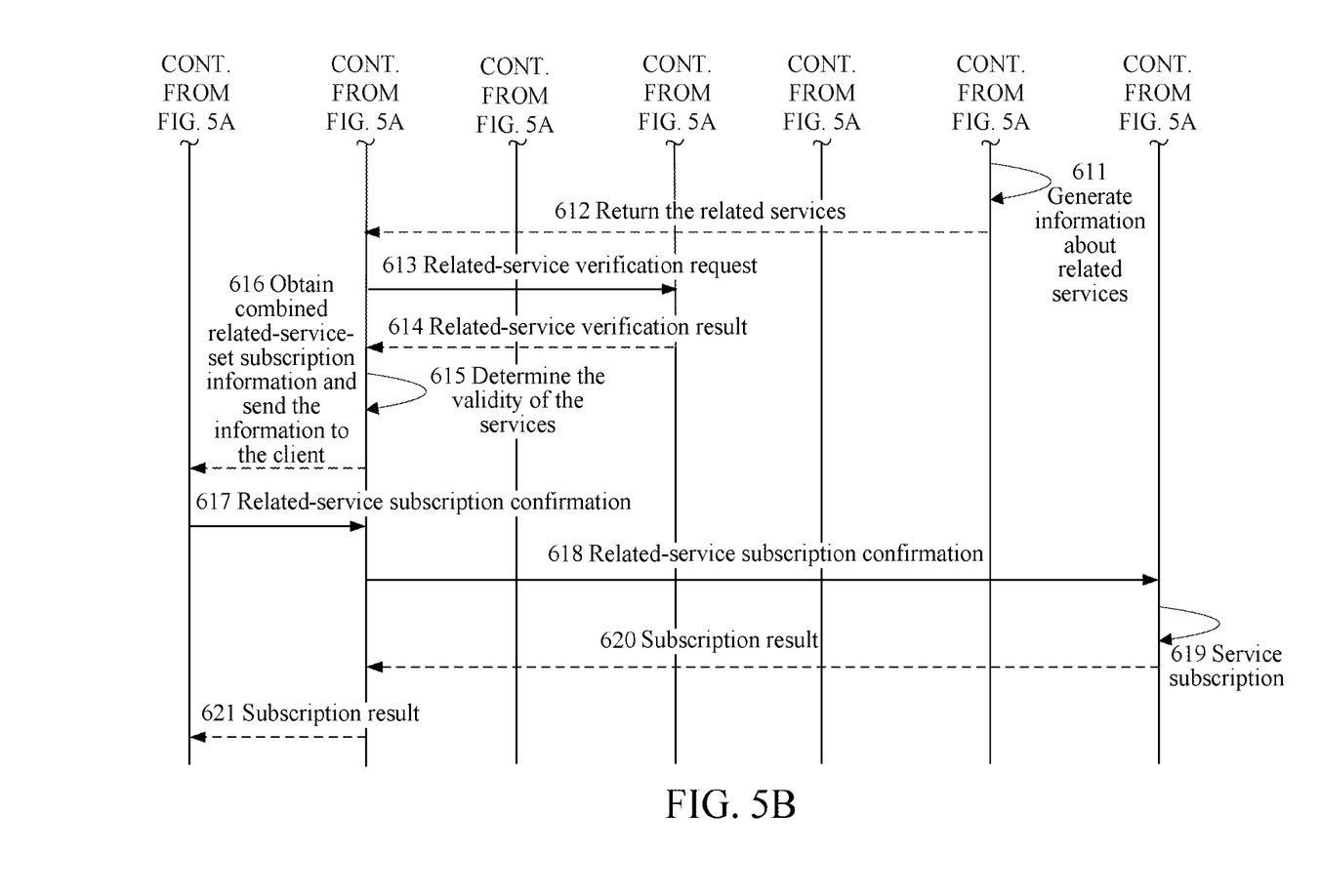

In a second embodiment, as shown in FIG. 5A-5B, the service subscription process specifically includes the following steps.

In Step 601, a client sends a subscription request to a subscription management module. The request carries a user ID and a service ID, and may also carry capability parameters of a terminal device. In this embodiment, the two identifiers and the capability parameters are all included as an example for illustration. The capability parameters of the terminal device include CPU, memory capacity, operating system version, supported protocols, and the like.

In Step 602, the subscription management module sends a verification request to a verification module. The request carries the user ID, the service ID, and the capability parameters of the terminal device.

In Step 603, the verification module finds items that need to be verified according to the service ID, and sends a query request to a user profile query module. The request carries the user ID and a verification item list. The verification item list includes one or more user profile item names, such as user credit rank, account balance, hobbies, and occupation.

In Step 604, the user profile query module transmits the user profile to the verification module.

In Step 605, the verification module performs a verification operation. Each data item in the query result is matched with the corresponding item in the verification rule table, and a verification result is generated. The specific implementation is the same as that in Step 507.

In Step 606, the verification module returns the verification result to the subscription management module.

In Step 607, if the verification is successful, the subscription management module sends a current service subscription request to the service server. The request carries the user ID and the current service ID. If the verification fails, the subscriber is rejected to subscribe to the service, and a subscription rejection explanation message is sent to the client. This subscription process ends.

In Step 608, the service server performs a service subscription operation.

In Step 609, the service server returns a subscription result to the subscription management module.

In Step 610, the subscription management module sends a match request to the service match server. The request carries the user ID and the current service ID, and may also carry the user profile and service information.

In Step 611, the service match server matches related services to obtain information about the related services, and returns the information about the related services to the service subscription server. The information about the related services may be recorded in the formed of a related service list. The related service list includes information about identifiers of one or more services and descriptions thereof. In this embodiment, that the information about the related services is recorded in a related service list is taken as an example for illustration. The specific implementation is the same as that in Step 512, and will not be repeated herein again.

In Step 612, the service match server sends the related service list to the subscription server.

In Step 613, the subscription management module transmits the user ID and the related service list to the verification module for verification. The specific verification process is the same as that in Step 514.

In Step 614, the verification module transmits a verification result of the related services to the subscription management module.

In Step 615, the subscription management module deletes the services that fail the verification from the related service list, and the rest of the services again serve as the related services.

In Step 616, the subscription management module combines the information about the service that the user has subscribed to and the information about the filtered related services into related-service-set subscription information, and returns the related-service-set subscription information to the service subscription client. The specific implementation is the same as that in Step 517.

In Step 617, the client selects all or a part of the services carried in the related-service-set subscription information, and sends a confirmation message to the subscription management module, for example, a message carrying a confirmed service list. The confirmed service list includes one or more service IDs.

In Step 618, the subscription management module sends a subscription request to a service server related to the service in the subscription service list. The request carries the user ID and the service ID.

In Step 619, each related service server performs a subscription operation.

In Step 620, the service server returns a related-service subscription result to the subscription management module.

In Step 621, the subscription management module sends the related-service subscription result to the client.

Seen from the descriptions of the above embodiments, the interaction process of related-service subscription is simplified and the system resources are saved. The service subscription server combines the service information about the service that the subscriber currently requests to subscribe to and the service information about its related services into related-service-set subscription information for the subscriber, and sends the related-service-set subscription information to the subscriber. The subscriber confirms the related services that need to be subscribed to depending on actual requirements, and the service server subscribes to the corresponding services according to the confirmation of the subscriber. Therefore, the following problem generated during the subscription in the prior art can be avoided. That is, if the subscriber accepts the services recommended by the subscription management server, the subscriber needs to perform a service subscription operation again to complete the subscription to the recommended services. Particularly, when a large number of recommended services are needed, the user has to perform the subscription request operation many times. Therefore, the subscription scheme in the prior art is rather inconvenient to operate, and plenty of system resources are consumed.

Moreover, in the subscription process according to the embodiment of the present invention, the service that the user currently subscribes to and its related services are together recommended to the user, and the user selects the desired services in real time, so as to increase the real-time performance of service subscription and increase the probability of related-service subscription.

In addition, in the above embodiments, the user can customize some related-service matching rules depending on actual requirements. Besides, the user may select the services to be subscribed to freely through various service combinations in the related-service-set subscription information and various service IDs, thereby eliminating the problems in the existing subscription process that the flexibility of service relations is low, the freedom of the user in service subscription is decreased, and the usability is undesirable to meet personal demands of the user.

Those of ordinary skill in the art should understand that all or a part of the steps in the method according to the embodiments of the present invention can be implemented by a program instructing relevant hardware, and the program may be stored in a computer readable storage medium, such as a ROM/RAM, a magnetic disk, or an optical disk.

It will be apparent to those skilled in the art that various modifications and variations can be made to the present invention without departing from the scope or spirit of the invention. In view of the foregoing, it is intended that the present invention cover modifications and variations of this invention provided they fall within the scope of the following claims and their equivalents.

What is claimed is:

1. A service subscription method implemented by a service subscription server having a program instructing hardware, comprising:

receiving a service subscription request for a service which a subscriber client is about to subscribe, wherein the service subscription request comprises a service ID that identifies the service which the subscriber client is about to subscribe and a user ID;

obtaining user information according to the user ID;

obtaining service subscription request information according to the service ID and related services information, wherein the related services information is information of related services that relate to the service which the subscriber client is about to subscribe;

generating related-service-set subscription information, wherein the related-service-set subscription information comprises the service subscription request information and the related services information; and returning the related-service-set subscription information to the subscriber client to perform service subscription transaction in order to recommend the related services to the subscriber client according to the related services information in the related-service-set subscription information;

wherein the obtaining of the related services information comprises:

searching a historical subscription record of prior service subscription of the subscriber client and other related services subscribed together with the prior service subscription according to the service ID and the user ID;

matching the related services from the historical subscription record, according to preset matching rules or user-defined rules and the user information; and obtaining the related services information through at least one of filtering and combining matched related services in the historical subscription record.

2. The method according to claim 1, the method comprising:

verifying service subscription validity according to the user information; and obtaining the related-service-set subscription information after a successful verification.

3. The method according to claim 2 comprising:

verifying validity of the related services information according to the user information, wherein upon verification:

combining the service subscription request information with a valid portion of the related services information to form the related-service-set subscription information; or deleting an invalid portion of the related services information from the related-service-set subscription information.

4. The method according to claim 2, wherein the related services information comprises at least one related services ID, wherein the at least one related services ID corresponds to the service ID of the service subscription request.

5. The method according to claim 1, wherein the related-service-set subscription information comprises at least one of:

combinations of the service subscription request information and the related services information according to preset policies;

the service ID of the service subscription request and service IDs of the related services information; and service subscription instructions which are used to instruct the subscriber client on how to perform service subscription transaction.

6. A service subscription server, comprising:

a subscription management module, adapted to:

receive a service subscription request for a service which a subscriber client is about to subscribe, and query a service query module for information about the requested service according to a service ID in the request, wherein the service ID identifies the service which the subscriber client is about to subscribe;

obtain user information according to a user ID in the request;

request a service match server to match for related services, and receive information about the related services returned by the service match server, wherein the related services are services that relate to the service which the subscriber client is about to subscribe;

combine the information about the requested service and the information about the related services of the service into related-service-set subscription information;

return the related-service-set subscription information to the subscriber client to perform service subscription transaction in order to recommend the related services to the subscriber client according to the information about the related services in the related-service-set subscription information, or request the service match server to match the related services, wherein the related-service-set subscription information is generated from a combination of the information about the requested service and information about the related services, wherein the service query module upon receiving the query for information about the requested service from the subscription management module, searches for the information about the requested service according to a query parameter contained in the service subscription request, and returns the information about the requested service to the subscription management module;

wherein the service match server:

searches a historical subscription record of prior service subscription of the subscriber client and other related services subscribed together with the prior service subscription according to the service ID and the user ID;

matches the related services from the historical subscription record, according to preset matching rules or user-defined rules and the user information; and obtains the related services information through at least one of filtering and combining matched related services in the historical subscription record.

7. The server according to claim 6, wherein the subscription management module is further adapted to:

return the received information about the requested service from the service query module to the subscriber client; and receive a service subscription selection request from the subscriber client according to the related-service-set subscription information, and forward the service subscription selection request to a corresponding service server.

8. The server according to claim 7, wherein the service subscription server further comprises:

a user profile query module, adapted to receive a user profile query request sent by the subscription management module, and return a query result to a service verification module, wherein the service verification module is adapted to:

receive a verification request from the subscription management module;

send the user profile query request to the user profile query module;

verify validity of the requested service according to the query result returned by the subscription management module, and return verification result of the requested service to the subscription management module, wherein:

the subscription management module is further adapted to:

reject the requested service if the verification result is invalid, or confirm whether the related services are valid according to the verification result returned from the service verification module; and delete invalid related services from the related-service-set subscription information when combining the information about the requested service and the information about the related services.

9. The service subscription server according to claim 6, wherein the related service comprises at least one related service ID, wherein the at least one related service ID corresponds to the service ID of the service subscription request.

10. A service subscription system, comprises:

a service subscription server, adapted to:

receive a service subscription request for a service which a subscriber client is about to subscribe;

obtain user information according to a user ID contained in the service subscription request;

obtain information about the requested service according to a service ID carried in the service subscription request, wherein the service ID identifies the service which the subscriber client is about to subscribe;

request a service match server to match related services, wherein the related services are services that relate to the service which the subscriber client is about to subscribe;

receive related-service-set subscription information generated by the service match server, wherein the related-service-set subscription information comprises a combination of the information about the requested service and information about the related services; and return the related-service-set subscription information to the subscriber client for service selection in order to recommend the related services to the subscriber client according to the information about the related services in the related-service-set subscription information;

wherein the service match server is adapted to:

search a historical subscription record of prior service subscription of the subscriber client and other related services subscribed together with the prior service subscription according to the service ID and the user ID;

match the related services from the historical subscription record, according to preset matching rules or user-defined rules and the user information; and obtain the related services information through at least one of filtering and combining matched related services in the historical subscription record;

combine the information about the requested service and information found about the related services into related-service-set subscription information;

return the related-service-set subscription information to the service subscription server; and forward the related-service-set subscription information to the subscriber client to perform service subscription transaction.

11. The system according to claim 10, wherein the service subscription server is further adapted to: verify validity of the requested service according to the user information;

reject the service subscription request if verification fails; or obtain user information according to the user ID and verify whether the related services are valid according to user information; and delete invalid related services when combining the information about the requested service and the information about the related services.

12. The system according to claim 10, wherein each of the related services comprises at least one related services ID, wherein the at least one related services ID corresponds to the service ID of the service subscription request.

13. A service match server, comprises:

a receiving module, adapted to receive a service subscription request from a service subscription server for a service which a subscriber client is about to subscribe, wherein the receiving module matches related services;

a relating module, adapted to search for and obtain the related services according to preset matching rules, wherein the related services are services that relate to the service which the subscriber client is about to subscribe;

a service combining module, adapted to combine the information about the related services and the information about the service subscription request into related-service-set subscription information; and a sending module, adapted to:

send the information about the related services and the related-service-set subscription information to the service subscription server; and forward the related-service-set subscription information to the subscriber client to perform service subscription transaction in order to recommend the related services to the subscriber client according to the information about the related services in the related-service-set subscription information;

wherein the relating module:

searches a historical subscription record of prior service subscription of the subscriber client and other related services subscribed together with the prior service subscription according to the service ID and the user ID;

matches the related services from the historical subscription record, according to preset matching rules or user-defined rules and the user information; and obtains the related services information through at least one of filtering and combining matched related services in the historical subscription record.

14. A non-transitory computer readable medium, comprising computer program codes stored thereon, executable by one or more digital processor for evaluating quality inspection, wherein the computer program codes comprise instructions performing functions, comprising:

receiving a service subscription request for a service which a subscriber client is about to subscribe, wherein the service subscription request comprises a service ID, wherein the service ID identifies the service which the subscriber client is about to subscribe;

obtaining information about the service subscription request and information about related services according to the service ID, wherein the related services are services that relate to the service which the subscriber client is about to subscribe;

generating related-service-set subscription information from the information about the service subscription request and the information about the related services; and returning the related-service-set subscription information to the subscriber client to perform service subscription transaction in order to recommend the related services to the subscriber client according to the information about the related services in the related-service-set subscription information;

wherein the obtaining of the related services information comprises:

searching a historical subscription record of prior service subscription of the subscriber client and other related services subscribed together with the prior service subscription according to the service ID and the user ID;

matching the related services from the historical subscription record, according to preset matching rules or user-defined rules and the user information; and obtaining the related services information through at least one of filtering and combining matched related services in the historical subscription record.

15. The non-transitory computer readable medium according to claim 14, wherein each of the related services comprises at least one related services ID, wherein the at least one related services ID corresponds to the service ID of the service subscription request.

* * * * *